Patented Feb. 27, 1951

2,543,542

UNITED STATES PATENT OFFICE 2,543,542

MINERAL OIL COMPOSITION

Darwin E. Badertscher and Charles F. Feasley, Woodbury, N. J., assignors to Socony-Vacuum Oil Company, Incorporated, a corporation of New York No Drawing. Application October 6, 1945, Serial No. 620,846

15 Claims. (Cl. 252—45)

This invention has to do with the stabilization of viscous mineral oil fractions against the deleterious effects of oxidation or use, by the addition thereto of an oxidation inhibitor. More specifically, the present invention is directed to the improvement of viscous mineral oil fractions by the use of novel reaction products or compounds which, when admixed with viscous mineral oil fractions in minor proportions, will prevent or delay undesirable changes taking place in the oil.

It is well known to those familiar with the art that substantially all of the various fractions obtained from mineral oils and refined for their various uses are susceptible to oxidation. The susceptibility of an oil fraction to oxidation and the manner in which oxidation manifests itself within the oil varies with the type and degree of refinement to which the oil has been subjected and with the conditions under which it is used or tested. Thus, the products formed in an oil fraction as a result of oxidation and the degree to which they are formed depends upon the extent to which the various unstable constituents, or constituents which may act as oxidation catalysts, have been removed by refining operations and also upon the conditions of use.

The present invention is predicated upon the discovery of a novel class of oil-soluble, sulfur-containing compounds or reaction products which, when incorporated in mineral oil fractions, effectively increase the resistance of said oils to oxidation. These oil-soluble, sulfur-containing compounds or reaction products are obtained by reaction of a mercaptan and a terpene. These materials are also contemplated herein as new compositions of matter.

All mercaptans are suitable for use herein and, accordingly, may be represented by the general formula: R—SH, wherein R may be alkyl, aralkyl, cycloalkyl or a substituted group thereof. The last-mentioned group may contain 1 or more substituents such as ether, ester, sulfide (mono and poly), thiocarbonate (mono and poly) and the like. Typical mercaptans are ethyl, propyl, butyl, dodecyl, benzyl, cyclohexyl and chlorbenzyl mercaptans. Preferred, however, are tertiary mercaptans and, of these, tertiary butyl mercaptan is particularly preferred.

Terpenes used herein may be monocyclic, dicyclic, olefinic, sesquiterpenes or polyterpenes. These various terpene sub-classes are represented by the following typical materials: dipentene, terpinene, terpinolene, menthene, and carvone, pinene, camphene, fenchene, bornylene, cyclopentadiene, geraniol, nerol, citronellol, farnesol, squalene; etc.

The reaction products or compounds of this invention may be prepared by reacting a mercaptan and a terpene in the presence of a condensing agent or a catalyst such as $H_3PO_4$, $H_2SO_4$, chloracetic acid, $BF_3$ and $BF_3$ etherates, etc. While the reaction temperatures may vary considerably, depending upon the reaction time and the quantities of reactants, etc., it is generally preferred that the mercaptan and terpene be reacted at the reflux temperatures of the reaction mixture for a relatively short period, rather than at lower reaction temperatures for a longer period. In general, temperatures of the order of about 0° C. to 150° C. and reaction periods of about 1 to 48 hours (depending upon the catalyst used) provide satisfactory oil-soluble, sulfur-containing reaction products. The reaction mixture is generally water washed to remove any acid catalyst, such as chloracetic acid, and dried with a suitable desiccant, as $CaCl_2$ and the like. Thereafter, the reaction mixture may be fractionated, preferably by vacuum distillation, to remove any unreacted terpene or mercaptan or both and to obtain the desired oil-soluble, sulfur-containing reaction product or compound.

These materials are generally referred to herein as reaction products rather than compounds, inasmuch as the reaction products usually contain one or more individual compounds formed by the addition of a mercaptan to an olefin group of the terpene.

These materials are illustrated hereinafter by the following typical reaction products.

EXAMPLE I

PINENE-TERTIARY BUTYL MERCAPTAN REACTION PRODUCT

A quantity, 138 grams, of a commercial grade of pinene (boiling range 152–168° C.), 105 grams of 85% $H_3PO_4$ and 185 grams of tertiary butyl mercaptan were charged into a one liter, 3-neck flask fitted with a mechanical stirrer, reflux condenser and thermometer. The reaction mixture after being maintained for a short time at room temperature, 20° to 25° C., had a red color. Heat was applied to the flask and the temperature of the reaction mixture therein was gradually raised, over a period of ¾ hours, to the reflux temperature (liquid) 68° C. The reaction mixture was then refluxed for 40 hours. Thereafter the reaction mixture was chilled and the $H_3PO_4$ layer which separated therefrom was removed and washed with several portions (total 134 grams) of tertiary butyl mercaptan. The combined organic material was washed, dried over anhydrous calcium chloride and distilled under reduced pressure whereupon tertiary butyl mercaptan was removed and several oil-soluble sulfur-containing fractions were obtained.

| Fraction No. | Wt. Grams | B. Pt., °C. | Pressure, Mm. Hg |
|---|---|---|---|
| 1 | 26 | to 35 | 2.5 |
| 2 | 28 | 35–47 | 2.5 |
| 3 | 20 | 47–64 | 2.5 |
| 4 | 22 | 64–79 | 2.6–3.8 |
| 5 | 104 | 79–96 | 3.8 |
| Residue | 10 | >96 | 3.8 |

Fractions 5 and 6 were analyzed for sulfur content and molecular weight:

| Fraction | Per Cent | Molecular Weight |
|---|---|---|
| 5 | 10.6 sulfur | 202 |
| 6 | 12.01 sulfur | 208 |

(theoretical values for $C_{10}H_{17}SC(CH_3)_3$ are 14.2 per cent sulfur and molecular weight 226).

Hereinafter, fractions 5 and 6 are referred to as products I–5 and I–6, respectively.

EXAMPLE II

PINENE-ISOPROPYL MERCAPTAN REACTION PRODUCT

A mixture of 45 grams (0.33 mol) of alpha-pinene, 50 grams (0.66 mol) of isopropyl mercaptan and 33 grams of 85 per cent orthophosphoric acid, in a flask of the type described in Example I above, were stirred at 20°–25° C. for 30 minutes and then at reflux (liquid) 62° C. for 25 hours. Thereafter, the reaction mixture was cooled whereupon two layers were formed. The bottom layer, predominantly phosphoric acid, was removed and extracted with two separate portions of benzene. The benzene extracts were washed with water and were added to the top layer (obtained from the reaction mixture) after the latter had been water washed. The combined benzene extract and top layer was dried over anhydrous calcium chloride and distilled whereupon the following fractions were obtained:

| Fraction No. | Wt., gms. | Boiling Range, °C. | Mm. |
|---|---|---|---|
| 1 | 3.5 | 55–65 | 45 |
| 2 | 14 | 65–96 | 45 |
| 3 | 6.5 | 96–100 | 45 |
| 4 | 11.6 | 110–122 | 14 |
| Residue (Very Dark) | 3.0 | >122 | |

Fraction 4 (identified hereinafter as product II–4) was analyzed for sulfur content, 14.6 per cent, and molecular weight, 254. Theoretical values for $C_{10}H_{17}SCH(CH_3)_2$ are 12.9 per cent sulfur and 249 molecular weight.

EXAMPLE III

CYCLOPENTADIENE-BENZYL MERCAPTAN REACTION PRODUCT

Dicyclopentadiene (60 grams; boiling range 160–170° C. with decomposition) was charged into a 500 cc. modified distillation flask fitted with a thermometer, dephlegmator and a total condenser beyond the dephlegmator leading directly to a one-liter, 3-neck reaction flask containing benzyl mercaptan and chloroacetic acid. The liquid temperature in the flask containing dicyclopentadiene was maintained at 160°–170° C. and the vapors thereof passing the dephlegmator fluctuated between 75°–78° C., instead of 40°–41° C. expected for the pure monomer, thus indicating that some dimer was also present in the vapor.

A total of 47 grams (0.71 mol of monomer or 0.36 mol of dimer) of cyclopentadiene was distilled into the reaction flask containing 70 grams (0.56 mol) of benzyl mercaptan and two grams of chloroacetic acid. The reaction mixture thus formed was stirred at 25° C. for 2 hours. After all of the cyclopentadiene had been added the reaction mixture was refluxed, 125° C. (liquid) for 24 hours. The reaction mixture was washed with water, which removed chloroacetic acid, and the water-washed product was dried with anhydrous calcium chloride and distilled into fractions ranging from non-viscous, colorless liquids to red, semi-viscous oils. Forty-five grams of an orange-red product (product III–1), and 11 grams of a red product (product III–2), were obtained. Product III–1 contains 17.4 per cent sulfur and has a molecular weight of 224. Product III–1 is predominantly $C_5H_7SCH_2C_6H_5$, which has a sulfur content of 16.8 per cent and a molecular weight of 190. Product III–2, which contains 15.2 per cent sulfur and has a molecular weight of 224, appears to be a mixture of $C_5H_7SCH_2C_6H_5$ and $C_{10}H_{13}SCH_2C_6H_5$ formed by reaction of the mercaptan with some monomer and some dimer. Theoretical values for $C_{10}H_{13}SCH_2C_6H_5$ are 12.5 per cent sulfur and a molecular weight of 256.

The following tests and results thereof illustrate the effectiveness of the class of reaction products contemplated herein as oil-improving agents.

OXIDATION TEST

The oil described below and blends thereof were subjected to the modified German tar test. Such a test involves heating a 150 gram sample of the oil at a temperature of 120° C. while bubbling oxygen gas through the oil for a period of 70 hours. The acidic oxidation products formed were then determined by titrating with alcoholic potash. Results for the oil and for the oil blends containing typical reaction products contemplated herein are given in Table I below in terms of neutralization numbers (N. N.), such numbers representing the acidity of the oil at the end of the test.

The oil used in this test was a highly refined oil suitable for use in transformers which had been prepared by treating a coastal distillate with 40 pounds of 98 per cent sulfuric acid and 180 pounds of 103 per cent oleum per barrel, followed by a clay percolation. It has a specific gravity of 0.871, a flash point of 310° F., and a Saybolt Universal viscosity (S. U. V.) of 69 seconds at 100° F.

Table I

| Improving Agent | Conc., Wt. Per Cent | N. N. Value |
|---|---|---|
| None | | 25.00 |
| Product II–4 | 0.1 | 0.02 |
| Product III–1 | 0.1 | 0.02 |
| Product III–2 | 0.1 | 0.02 |

CORROSION TEST

Motor oils, especially those refined by certain solvent-extraction methods, tend to oxidize when submitted to high temperature and to form products that are corrosive to metal bearings. This corrosive action may be quite severe with certain bearings, such as those having the corrosion-susceptibility of cadmium-silver alloys; and it may cause their failure within a comparatively short time. The following test was used to determine the corrosive action of a motor oil on an automobile connecting-rod bearing.

The oil used consisted of Pennsylvania neutral and residuum stocks separately refined by means of Chlorex and then blended to give an S. A. E. 20 motor oil with a specific gravity of 0.872, a flash point of 435° F. and a Saybolt Universal viscosity of 318 seconds at 100° F. The oil was tested by adding a section of a bearing containing a cadmium-silver alloy surface and weighing about 6 grams and heating it to 175° C. for 22 hours while a stream of air was bubbled against the surface of the bearing. The loss in weight of the bearing during this treatment measures the amount of corrosion that has taken place. A sample of the oil containing a stabilizer was run at the same time as a sample of the straight oil, and the loss in weight of the bearing section in the inhibited oil could thus be compared directly with the loss of the section in the uninhibited oil. The results obtained in this test are set forth in Table II below:

BUBBLE TEST

Table II

| Improving Agent | Conc. Wt. Per Cent | Mgms. Loss in Wt. | |
|---|---|---|---|
| | | Inhibited | Uninhibited |
| Product II-4 | 0.5 | 6 | 24 |
| Do | 1.0 | 1 | 24 |
| Product III-1 | 0.5 | 0 | 24 |
| Do | 1.0 | 0 | 24 |
| Product III-2 | 0.5 | 0 | 24 |
| Do | 1.0 | 0 | 24 |

It will be apparent from the foregoing results that the reaction products contemplated herein are highly effective in stabilizing viscous mineral oil fractions against the normal deteriorating effects of oxidation as manifested by development of acidity, color and sludge; and further that these reaction products are highly effective in retarding the corrosive action encountered when certain oils are used in lubricating normally corrosive alloy bearings. The quantity of reaction product used in an oil may be varied depending upon the character of the oil and the severity of the conditions to which it is exposed. In general, however, satisfactory results are obtained with concentration from about 0.1 per cent to about 5 per cent.

It is to be understood that while we have described in detail certain typical reaction products and reaction procedures which may be employed in synthesizing the same, the invention is not confined thereto but includes within its scope such changes and modifications as fairly come within the spirit of the appended claims.

We claim:

1. An improved mineral oil composition comprising a viscous mineral oil fraction having in admixture therewith a minor proportion, sufficient to stabilize said oil fraction against the deleterious effects of oxidation, of an oil-soluble, sulfur-containing reaction product obtained by reacting one mol of a terpene with about two mols of a mercaptan, in the presence of a condensing agent, at a temperature of from about 0° C. to about 150° C. and for a time period of from about 1 to about 48 hours.

2. An improved mineral oil composition comprising a viscous mineral oil fraction having in admixture therewith a minor proportion; from about 0.1 per cent to about 5 per cent, of an oil-soluble, sulfur-containing reaction product obtained by reacting one mol of a terpene with about two mols of a mercaptan, in the presence of a condensing agent, at a temperature of from about 0° C. to about 150° C. and for a time period of from about 1 to about 48 hours.

3. An improved mineral oil composition comprising a viscous mineral oil fraction having in admixture therewith a minor proportion, sufficient to stabilize said oil fraction against the deleterious effects of oxidation, of an oil-soluble, sulfur-containing reaction product obtained by reacting one mol of a terpene with about two mols of an aryl-substituted mercaptan, in the presence of a condensing agent, at a temperature of from about 0° C. to about 150° C. and for a time period of from about 1 to about 48 hours.

4. An improved mineral oil composition comprising a viscous mineral oil fraction having in admixture therewith a minor proportion, sufficient to stabilize said oil fraction against the deleterious effects of oxidation, of an oil-soluble, sulfur-containing reaction product obtained by reacting one mol of a terpene with about two mols of a benzyl mercaptan, in the presence of a condensing agent, at a temperature of from about 0° C. to about 150° C. and for a time period of from about 1 to about 48 hours.

5. An improved mineral oil composition comprising a viscous mineral oil fraction having in admixture therewith a minor proportion, sufficient to stabilize said oil fraction against the deleterious effects of oxidation, of an oil-soluble, sulfur-containing reaction product obtained by reacting one mol of a terpene with about two mols of a secondary mercaptan, in the presence of a condensing agent, at a temperature of from about 0° C. to about 150° C. and for a time period of from about 1 to about 48 hours.

6. An improved mineral oil composition comprising a viscous mineral oil fraction having in admixture therewith a minor proportion, sufficient to stabilize said oil fraction against the deleterious effects of oxidation, of an oil-soluble, sulfur-containing reaction product obtained by reacting one mol of a terpene with about two mols of an isopropyl mercaptan, in the presence of a condensing agent, at a temperature of from about 0° C. to about 150° C. and for a time period of from about 1 hour to about 48 hours.

7. An improved mineral oil composition comprising a viscous mineral oil fraction having in admixture therewith a minor proportion, sufficient to stabilize said oil fraction against the deleterious effects of oxidation, of an oil-soluble, sulfur-containing reaction product obtained by reacting one mol of a terpene with about two mols of a tertiary mercaptan, in the presence of a condensing agent, at a temperature of from about 0° C. to about 150° C. and for a time period of from about 1 to about 48 hours.

8. An improved mineral oil composition comprising a viscous mineral oil fraction having in admixture therewith a minor proportion, sufficient to stabilize said oil fraction against the deleterious effects of oxidation, of an oil-soluble, sulfur-containing reaction product obtained by reacting one mol of a terpene with about two mols of a tertiary butyl mercaptan, in the presence of a condensing agent, at a temperature of from about 0° C. to about 150° C. and for a time period of from about 1 to about 48 hours.

9. An improved mineral oil composition comprising a viscous mineral oil fraction having in admixture therewith a minor proportion, sufficient to stabilize said oil fraction against the deleterious effects of oxidation, of an oil-soluble, sulfur-containing reaction product obtained by reacting one mol of a dicyclic terpene with about two mols of a mercaptan, in the presence of a condensing agent, at a temperature of from about 0° C. to about 150° C. and for a time period of from about 1 to about 48 hours.

10. An improved mineral oil composition comprising a viscous mineral oil fraction having in admixture therewith a minor proportion, sufficient to stabilize said oil fraction against the deleterious effects of oxidation, of an oil-soluble, sulfur-containing reaction product obtained by reacting one mol of pinene with about two mols of a mercaptan, in the presence of a condensing agent, at a temperature of from about 0° C. to about 150° C. and for a time period of from about 1 to about 48 hours.

11. An improved mineral oil composition comprising a viscous mineral oil fraction having in admixture therewith a minor proportion, sufficient to stabilize said oil fraction against the deleterious effects of oxidation, of an oil-soluble, sulfur-containing reaction product obtained by reacting one mol of an olefinic terpene with about two mols of a mercaptan, in the presence of a condensing agent, at a temperature of from about 0° C. to about 150° C. and for a time period of from about 1 to about 48 hours.

12. An improved mineral oil composition comprising a viscous mineral oil fraction having in admixture therewith a minor proportion, sufficient to stabilize said oil fraction against the deleterious effects of oxidation, of an oil-soluble, sulfur-containing reaction product obtained by reacting one mol of cyclopentadiene with about two mols of a mercaptan, in the presence of a condensing agent, at a temperature of from about 0° C. to about 150° C. and for a time period of from about 1 to about 48 hours.

13. An improved mineral oil composition comprising a viscous mineral oil fraction having in admixture therewith a minor proportion, sufficient to stabilize said oil fraction against the deleterious effects of oxidation, of an oil-soluble, sulfur-containing reaction product obtained by reacting one mol of cyclopentadiene with about two mols of a benzyl mercaptan, in the presence of a condensing agent, at a temperature of from about 0° C. to about 150° C. and for a time period of from about 1 to about 48 hours.

14. An improved mineral oil composition comprising a viscous mineral oil fraction having in admixture therewith a minor proportion, sufficient to stabilize said oil fraction against the deleterious effects of oxidation, of an oil-soluble, sulfur-containing reaction product obtained by reacting one mol of pinene with about two mols of an isopropyl mercaptan, in the presence of a condensing agent, at a temperature of from about 0° C. to about 150° C. and for a time period of from about 1 to about 48 hours.

15. An improved mineral oil composition comprising a viscous mineral oil fraction having in admixture therewith a minor proportion, sufficient to stabilize said oil fraction against the deleterious effects of oxidation, of an oil-soluble, sulfur-containing reaction product obtained by reacting one mol of pinene with about two mols of a tertiary butyl mercaptan, in the presence of a condensing agent, at a temperature of from about 0° C. to about 150° C. and for a time period of from about 1 to about 48 hours.

DARWIN E. BADERTSCHER.
CHARLES F. FEASLEY.

REFERENCES CITED

The following references are of record in the file of this patent:

UNITED STATES PATENTS

| Number | Name | Date |
|---|---|---|
| 2,043,961 | Kaufman | June 9, 1936 |
| 2,329,486 | Rummelsburg | Sept. 19, 1943 |
| 2,332,165 | Ott | Oct. 19, 1943 |
| 2,422,275 | Winnins | June 17, 1947 |